United States Patent [19]

Noda et al.

[11] Patent Number: 4,835,211

[45] Date of Patent: May 30, 1989

[54] CATIONIC LATEX COMPOSITIONS CAPABLE OF PRODUCING ELASTOMERS WITH HYDROPHILIC SURFACES

[75] Inventors: Isao Noda, Cincinnati; Douglas F. Hager, West Chester, both of Ohio

[73] Assignee: The Procter & Gamble Company, Cincinnati, Ohio

[21] Appl. No.: 172,031

[22] Filed: Mar. 23, 1988

Related U.S. Application Data

[62] Division of Ser. No. 943,983, Dec. 18, 1986, Pat. No. 4,785,030.

[51] Int. Cl.$^4$ .............................................. C08Y 5/06
[52] U.S. Cl. .................................. 524/762; 526/311; 526/312; 526/320
[58] Field of Search ............... 526/320, 311, 312; 524/762

[56] References Cited

U.S. PATENT DOCUMENTS

| | | | |
|---|---|---|---|
| 2,745,744 | 5/1956 | Weidner et al. | 162/168 |
| 3,329,638 | 7/1967 | Blyth | 260/29.6 |
| 3,397,165 | 8/1968 | Goodman et al. | 260/29.7 |
| 3,556,932 | 1/1971 | Coscia et al. | 162/166 |
| 3,556,933 | 1/1971 | Coscia et al. | 162/167 |
| 3,575,913 | 4/1971 | Meier | 260/29.7 |
| 3,700,623 | 10/1972 | Keim | 260/80.3 |
| 3,772,076 | 11/1976 | Keim | 117/155 |
| 3,926,890 | 12/1975 | Huang et al. | 260/29.6 |
| 3,965,032 | 6/1976 | Gibbs | 526/329.2 |
| 3,978,160 | 8/1976 | Seiler et al. | 260/874 |
| 4,026,962 | 5/1977 | Lambia et al. | 260/827 |
| 4,121,966 | 10/1978 | Amano et al. | 162/164 |
| 4,189,345 | 2/1980 | Foster et al. | 162/168 |
| 4,325,856 | 4/1982 | Ishikawa et al. | 523/201 |
| 4,385,164 | 5/1983 | Sinclair | 526/201 |
| 4,537,911 | 8/1985 | Chonde | 526/329.2 |

OTHER PUBLICATIONS

Streitwiesser—Introduction to Organic Chemistry 3rd, 1985, p. 690.

*Primary Examiner*—Joseph L. Schofer
*Assistant Examiner*—Peter D. Mulcahy
*Attorney, Agent, or Firm*—Jerry J. Yetter; Eric W. Guttag; Richard C. Witte

[57] ABSTRACT

Latex compositions suitable for applications requiring surface hydrophilicity are disclosed. The compositions comprise: (1) a liquid phase selected from the group consisting of water, water-miscible solvents and mixtures thereof; and (2) latex particles dispersed in the liquid phase. The particles comprise an elastomeric hydrophobic core and a hydrophilic "shell" which is integral with the core and which colloidally stabilizes the latex particles in the liquid phase. The shell comprises moieties L-Q attached to the core, wherein Q is a nonionic group end-capped with a cationic moiety, and L is a linking unit. When the liquid phase is removed, the particles are capable of forming an elastomeric film having a substantially permanent cationic, hydrophilic surface. The cationic moiety helps the latex particles become attracted to anionic surfaces such as cellulosic materials.

1 Claim, No Drawings

CATIONIC LATEX COMPOSITIONS CAPABLE OF PRODUCING ELASTOMERS WITH HYDROPHILIC SURFACES

This is a division of application Ser. No. 943,983, filed on Dec. 18, 1986, now U.S. Pat. No. 4,785,030.

TECHNICAL FIELD

The present application relates to latex compositions having surface hydrophilicty.

Materials which have hydrophilic surfaces are easily wetted by water and other polar liquids. This should be contrasted with bulk hydrophilicity where the material "swells" in the presence of these polar liquids. Materials without bulk hydrophilicity having only surface hydrophilicity do not swell, which can be highly desirable where "wet strength" is required. Materials which are bulk hydrophilic often have decreased wet strength when swollen with water.

For many product applications the hydrophilic surface needs to have some degree of permanency. Basically, this translates into the ability of the surface to maintain wettability after repeated exposures to water or other polar liquids, as well as exposure to air. Permanency of the hydrophilic surface can be particularly difficult where the underlying bulk material is hydrophobic, such as in the case of polyethylene or polypropylene films. In these instances, the hydrophilic surface layer needs to be compatible and adherent to the underlying bulk material; otherwise, the hydrophilic surface can be stripped away after relatively few exposures to water or other polar liquids. In addition, when the underlying bulk material is soft or elastomeric, the surface layer can be "swallowed up", resulting in a loss of surface hydrophilicity.

Surface hydrophilicity is preferably combined with other properties such as flexibility, elasticity and strength. One category of materials desirably having such combined properties includes the binder systems used in making non-woven fabrics and paper products. A variety of latex compositions have previously been used as binders, including acrylic (methacrylic) latexes and styrene-butadiene latexes. These latexes are typically formed by emulsion polymerization of the respective monomers and can optionally contain surfactants to stabilize the latex particles, as well as to impart a certain amount of hydrophilicity to the nonwoven product. These prior art latex binder systems tend to be nonwettable (hydrophobic) or to lose their wettability after repeated exposure to water. Additionally, the mechanical strength of these binders can vary greatly depending on changes in pH.

The cationic latex compositions herein are especially useful as additive binder systems in making clothlike paper and other nonwoven products.

There are three important physical properties of clothlike paper products. These properties are softness; absorbency, particularly of aqueous fluids; and strength, particularly strength when wet. Softness is the tactile sensation perceived when the consumer holds the product, rubs it across the skin, or crumples it with the hand. This tactile sensation can be related to the stiffness of the paper product. Absorbency is a measure of the ability of the product to absorb quantities of liquid, particularly aqueous fluids or dispersions. Strength is the ability of the product to maintain physical integrity, and to resist tearing, bursting and shredding under use conditions, particularly when wet. Research and development efforts have been directed to improvement of each of these properties without adversely affecting the others, as well as improvement of two or three of these properties simultaneously.

Water-soluble cationic resins are often used as wet-strength additives in paper making. One such group of wet-strength additives are the polyamide-epichlorohydrin resins sold under the trade name Kymene. See, for example, U.S. Pat. No. 3,700,623 to Keim issued Oct. 24, 1972; and U.S. Pat. No. 3,772,076 to Keim, issued Nov. 13, 1973. Another group of water-soluble cationic wet-strength resins are the polyacrylamides sold under the trade name Parez. See, for example, U.S. Pat. No. 3,556,932 to Coscia et al, issued Jan. 19, 1971; and U.S. Pat. No. 3,556,933 to Williams et al issued Jan. 19, 1971.

The cellulosic fibers used in papermaking are negatively charged. Since the water-soluble wet-strength resins are cationic (positively charged), they are deposited and retained well when directly added to the aqueous pulp slurry. Such "wet-end addition" is highly desirable in papermaking. Subsequently in the papermaking process, these resins cross-link and eventually become insoluble in water. When this occurs, the wet-strength resin acts as a "glue" to hold the fibers of the paper together. This results in the desired wet-strength property.

Paper products made with such resins generally have a stiff, paper-like feel. To impart greater softness to the paper product, styrene-butadiene latexes can be used as the binder system. However, these styrene-butadiene latexes are either nonionic in character or else are partially anionic due to inclusion of anionic comonomers or surfactants. The nonionic styrene-butadiene latexes cannot be used as "wet-end additives" in a conventional papermaking process. Instead, these nonionic latexes have to be impregnated or pattern-printed on the subsequently laid paper furnish, such as by the process described in European Patent Application No. 33,988 to Graves et al, published Aug. 19, 1981.

An anionic styrene-butadiene latex can be used in a conventional wet-end additive papermaking process by adding a cationic polyelectrolyte. See, for example, U.S. Pat. No. 4,121,966 to Amano et al, issued Oct. 24, 1978; and U.S. Pat. No. 2,745,744 to Weidner et al, issued May 15, 1956. The cationic polyelectrolyte used is typically a water-soluble cationic wet-strength resin. Basically, the cationic polyelectrolyte, when added, destabilizes the dispersed anionic latex particles which then flocculate and deposit on the paper fibers. Accordingly, the cationic polyelectrolyte and anionic styrene-butadiene latex cannot be combined together until the point at which they are used as the binder system in papermaking.

Styrene-butadiene latexes have also been modified to provide cationic groups chemically bound on the surface of the latex particles. See, for example, U.S. Pat. NO. 4,189,345 to Foster et al, issued Feb. 19, 1980; and U.S. Pat. No. 3,926,890 to Huang et al, issued Dec. 16, 1975. Incorporation of the cationic groups on the surface of the latex particles converts the latex into a wet-end additive like the water-soluble cationic wet-strength resins. These cationic latexes appear to have adequate colloidal stability, especially when nonionic or preferably cationic surfactants are added. However, the deposition and retention of the cationic latex particles on the paper fibers does not appear to be very great. Indeed, the cationic latex of the Foster et al patent appears to require a co-additive to enhance the deposition of the latex particles on the paper fibers.

Accordingly, a cationic latex which combines: (1) colloidal stability; and (2) enhanced deposition and retention of the latex particles on the paper fibers, would be highly desirable.

Besides the papermaking art, there are circumstances where it would be desirable to impart a cationic finish to surfaces such as fabrics in order to provide an anti-static effect. The cationic latexes of this invention may be considered as substitutes for the quaternary ammonium compounds now typically used as anti-stats.

BACKGROUND ART

A. Cationic Latexes Having Particles with Styrene-Butadiene Core and Cationic Groups Chemically Bound on Surface U.S. Pat. No. 4,189,345 to Foster et al, issued Feb. 19, 1980, describes a fibrous product containing papermaking pulp, a structured-particle latex having pH independent cationic groups bound at or near the particle surface and a co-additive. The structured-particle latex has a copolymer core of styrene and butadiene, and an encapsulating layer of styrene, butadiene and vinylbenzyl chloride which is reacted with 2-(dimethyl amino) ethanol to form quaternary ammonium groups. The co-additive can be a hydrolyzed polyacrylamide having a degree of polymerization of 5500 and is used to enhance deposition of the cationic latex on the pulp fibers. In making the fibrous product, the structure-particle latex and an aqueous solution of the co-additive are added to an aqueous slurry of the pulp, which is then dewatered and dried by heating.

U.S. Pat. No. 3,926,890 to Huang et al, issued Dec. 16, 1975, discloses a process for preparing a "stable" cationic latex which is described as having "excellent adsorption" (only about 69% absorption of latex based on Example 5) onto substrates such as pulp, paper and the like. The Haung et al cationic latexes are prepared by emulsion polymerization of a haloalkyl ester of acrylic or methylcrylic acid with another monosaturated compound (e.g., butadiene) in the presence of a nonionic or preferably cationic surface active agent, and then reacting a basic nitrogen-containing compound with this copolymer to form the respective ammonium salt.

B. Use of Cationic Polyelectrolytes to Enhance the Depopsition of Anionic Styrene-Butadiene Latex Binder Systems on Paper Fibers U.S. Pat. No. 4,121,966 to Amano et al, issued Oct. 24, 1978, discloses a method for producing a fibrous sheet bonded with a latex flocculate. In this method, zinc white powders are added to a carboxy modified anionic latex. The pH of this mixture is adjusted to not less than 7, and then a water-soluble cationic polymer is added to obtain a latex flocculate. The latex flocculate is added to a fiber slurry which is formed into a sheet by a conventional papermaking process. Representative carboxy modified latexes include styrene-butadiene copolymers. Suitable water-soluble cationic polymers include polyamide-polyamineepichlorohydrin resins, polyethylene imine resins, cationic modified melamine-formalin resins, and cationic modified urea-formalin resins.

U.S. Pat. No. 2,745,744 to Weidner et al, issued May 15, 1956, discloses a method for incorporating polymeric or rubberlike materials into cellulosic fibers used to make paper. In this method, a colloidal dispersion of a hydrophobic polymer, such as a butadiene-styrene latex, is mixed with a paper pulp suspended in water. A poly-N-basic organic compound is then added to this mixture to cause particles of the colloidal dispersed material to adhere to the cellulosic fibers in the water suspension. The treated fiber is then formed into paper by conventional techniques.

SUMMARY OF THE INVENTION

The present invention encompasses latex compositions which comprise:
(1) a liquid phase selected from the group consisting of water, water-miscible solvents and mixtures thereof;
(2) latex particles dispersed in said liquid phase, said particles comprising an elastomeric hydrophobic core and an outer hydrophilic shell integral with said core, said shell comprising moieties L-Q, attached to the core, wherein Q is a hydrophilic group and L is a hydrophobic unit.

Preferred compositions herein comprise:
(a) an aqueous phase;
(b) from about 5 to about 50% by weight of latex particles dispersed in said aqueous phase, said particles comprising an elastomeric hydrophobic core and an outer hydrophilic shell attached to said core, said core comprising a polymer selected from the group consisting of butadiene, isoprene, styrene, and mixtures thereof, and said shell comprising moieties L-Q, wherein L comprises a hydrophobic hydrocarbyl group containing one or more unsaturated bonds and Q is of the formula

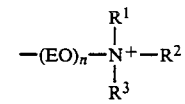

wherein $R^1$ and $R^2$ are each $C_1$ to $C_4$ alkyl or hydroxyalkyl, or together form a cyclic or heterocyclic ring, and $R^3$ is H or $C_1$-$C_4$ or hydroxyalkyl, and wherein n is an integer of from 5 to about 50.

The invention also emcompasses a process for preparing a latex composition which comprises the steps of:
(A) providing a mixture containing:
 (a) water;
 (b) a dispersion of from about 5 to about 50% of a substantially water-insoluble polymerizable component which comprises an elastomer monomer having double bonds;
 (c) an effective amount of a water-soluble free-radical polymerization initiator;
 (d) an effective amount of a water-soluble chain transfer agent; and
 (e) an effective amount of an amphiphilic diblock emulsifier LQ which comprises an unsaturated hydrophobic moiety L having one or more carbon-carbon double bonds and a hydrophilic block Q integral with said hydrophobic block; said hydrophilic block Q being a nonionic group end-capped with a cationic moiety; and
(B) heating the mixture to a temperature sufficient to cause emulsion polymerization of the polymerizable component, so as to provide a latex composition comprising latex particles capable of forming an elastomeric film having a substantially permanent hydrophilic surface when the water is removed.

A preferred process herein is wherein elastomer monomer (b) is a member selected from the group consisting of butadiene, isoprene, styrene, and mixtures thereof. Preferably, the diblock emulsifier (e) comprises a quaternary ammonium capped polyethyleneoxide derivative of a $C_{10}$–$C_{20}$ unsaturated hydrocarbyl moiety.

The invention also encompasses a process for improving the tactile impression of paper or fabric, comprising contacting said paper or fabric with the foregoing latex compositions and drying said paper or fabric. In an alternate mode, the process comprises contacting said paper or fabric with a mixture of a cationic hydrophilic latex of this invention and an anionic hydrophilic latex; more preferably, a mixed cationic/nonionic latex is used. Paper or fabric articles prepared in this manner also form part of this invention.

The invention also encompasses compounds of the formula LQ, wherein L is a hydrocarbyl moiety having at least one carbon-carbon double bond and Q is a nonionic group end-capped with a cationic moiety. Preferred compounds are those wherein Q is ethylene oxide end-capped with a quaternary ammonium moiety, as noted above. Conveniently, L can be a member selected from the group consisting of oleyl (preferred), linoleyl, linolenyl, eleostearyl, and parinaryl. An especially preferred compound herein is oleyl[EO]$_{1.9}$OCH$_2$CH$_2$N$^+$(CH)$_3$Br$^-$.

DISCLOSURE OF THE INVENTION

The present invention relates to cationic latex compositions. These compositions comprise:
(a) a liquid phase which is selected from the group consisting of water, water-miscible solvents, and mixtures thereof;
(b) an effective amount of latex particles dispersed in the aqueous phase;
(c) said particles comprising an elastomeric hydrophobic core and an outer cationic hydrophilic surface (or "shell") integral with the core;
(d) said hydrophilic surface comprising moieties L-Q or, optionally, a mixture of moieties L-Q and L-X attached to the core, wherein Q is a nonionic group end-capped with a cationic moiety, X is a nonionic group, and L is a linking group which chemically bonds to the elastomeric core.

The hydrophilic shell of the particles ultimately translates into the hydrophilic surface of the films formed therefrom. The outer surface of the latex particles also is sufficiently hydrophilic to colloidally stabilize the particles in the aqueous phase so they do not flocculate. Moreover, this outer shell has sufficient cationic charge density to cause deposition and retention of the latex particles on negatively charged surfaces such as cellulosic fibers. Accordingly, the cationic latex compositions of the present invention can be used as wet-end additive binders in making paper or other nonwoven products.

A. Definitions

As used herein, the term "hydrophilic" refers to materials which are substantially wetted by water.

As used herein, the term "hydrophobic" refers to materials which are substantially non-wetted by water.

As used herein, the term "elastomeric" refers to materials having rubber-like properties in terms of extensibility and elastic recovery. See *Condensed Chemical Dictionary* (9th edition 1977), page 335, which defines the term "elastomer".

As used herein, the term "comprising" means various components can be conjointly employed in the latex compositions of the present invention. Accordingly, the term "comprising" encompasses the more restrictive terms "consisting essentially of" and "consisting of".

All percentages, ratios and proportions herein are by weight, unless otherwise specified.

B. Cationic Latex Compositions

The cationic latex compositions of the present invention basically comprise: (1) an aqueous phase; and (2) latex particles dispersed in the aqueous phase to form a colloidally stable suspension thereof. Besides water, this aqueous phase can include minor amounts of water-miscible solvents. Suitable water-miscible solvents include the $C_1$–$C_3$ alcohols, such as methyl alcohol, ethyl alcohol and isopropyl alcohol, ketones such as acetone, and other water-miscible solvents such as ethyl acetate. However, the aqueous phase is typically substantially free, i.e., contains less than about 1% by weight, of these water-miscible solvents.

The key component of the latex composition is the latex particles dispersed in the aqueous phase. These latex particles are generally spherical in shape and are monodisperse in size, i.e. the particles sizes fall within a narrow range. These particles can sometimes be as large as several microns or as small as 10 nm. However, because the latex particles are typically formed by emulsion polymerization, these particles tend to be submicron in size. Typically, the particle size of these latex particles is in the range of from about 50 to about 100 nm.

These latex particles are dispersed in the aqueous phase in an effective amount. What is "an effective amount" of latex particles depends upon the particular use of the latex composition, the manner in which it is formed, and like factors. Latex compositions having high solids content of latex particles are preferred. Latex compositions of the present invention may comprise up to about 60% by weight latex particles on a solids basis. Typically, the latex particles comprise from about 10% to about 20% by weight of the latex composition on a solids basis.

The latex particles are comprised of both: (1) an elastomeric hydrophobic core; and (2) an outer cationic hydrophilic surface, or shell, which is integral with the elastomeric core. The shell can be integral with the core through either: (1) physical attachment; or (2) chemical attachment. For reasons of permanence, the shell is preferably chemically attached to the core. Chemical attachment results through covalent bonding of the shell to the core.

The elastomeric hydrobic core is the predominant component of the latex particles by weight. This elastomeric core is based on a polymer formed from an elastomer, typically in combination of other comonomers, to impart properties such as stiffness, strength, resistance to flowability at elevated temperature, etc. The polymers which form the elastomeric core usually have glass transition ($T_g$) values of about 35° C. or less. Preferred polymers for elastomeric cores preferably have $T_g$ values of about −10° C. or less.

The cationic hydrophilic surface is the primary functional component of the latex particles. The surface of the latex particles has two essential functions. The first is to provide sufficient hydrophilicity to colloidally stabilize the latex particles in the aqueous phase so as to prevent flocculation. The other function of this shell is to provide sufficient cationic charge density to cause deposition and retention of the latex particles on negatively charged surfaces, especially cellulose. For example in a papermaking process, latex particles which are not retained by the fibers can accumulate in the process water and contaminate the papermaking machinery; accordingly, it is desirable to maximize the amount of latex which is deposited and retained on the fibers. For cationic latex compositions of the present inventory this cationic charge density is sufficiently great to cause deposition and retention of as much as about 80–90% by weight of the latex particles on these fibers.

Moreover, the hydrophilic properties of the latexes herein can be used to impart "water-wettability" to otherwise hydrophobic surfaces, as described more fully, hereinafter.

The surface, or shell, of the latex particles comprises moieties L-Q or, optionally, a mixture of moieties L-Q and L-X attached to the elastomeric core, wherein Q is an alkoxylated cationic group, X is a nonionic group and L is the linking unit. These materials have surfactant and emulsifier properties, and are referred to as "diblocks".

The cationic group Q can be any compatible positively charged moiety which can cause deposition of the latex particles onto negatively charged cellulosic fibers. Suitable cationic groups Q include substituted ammonium groups having the formula:

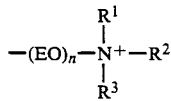

where $R^1$ and $R^2$ are each $C_1$–$C_4$ alkyl or hydroxyalkyl, or together form a cyclic or heterocyclic ring of from 4 to 6 carbon atoms (e.g., piperidine, morpholine); and $R^3$ is H (ammonium) or $C_1$–$C_4$ aklyl or hydroxyalkyl (quaternary); and EO is ethyleneoxy with n being an integer of from about 5 to 50, preferably 10 to 20. Particularly preferred substituted ammonium groups are those where $R^1$, $R^2$ and $R^3$ are each methyl. Suitable cationic groups Q also include sulfonium groups having the formula:

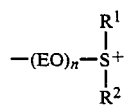

where $R^1$ and R are defined as before. Preferred sulfonium groups are those where $R^1$ and $R^2$ are each methyl.

Of course, the cationic substituents will be associated with an anionic substituent (A) to provide electrical neutrality. The nature of A is not critical to the practice of this invention. Anions such as halide, hydroxide and the like are typical; bromide is preferred.

The nonionic group X in nonionic diblocks can be any compatible neutrally charged moiety which does not substantially interfere with colloidal stability, or deposition and retention characteristics of the latex particles. Suitable nonionic groups X include hydroxyl, and preferably, polyethyleneoxide (EO units 5–50, preferably 10–20).

Linking unit "L" is any group which provides secure attachment of Q and X groups to the latex particles. As will be disclosed in more detail hereinafter, L is preferably an unsaturated hydrocarbyl species, especially oleyl.

The following Examples illustrate the preparation of the cationic diblock materials herein, as well as their use in a papermaking process. In general terms, addition of the cationic latex to a cellulose fiber slurry should be done with good mixing. If not properly mixed, it appears that the latex can cause clumping of the fibers.

C. Methods for Preparing Cationic Latex Compositions

1. Emulsion Polymerization

One method for preparing the cationic latex compositions of the present invention is by emulsion polymerization. In emulsion polymerization, a cationic (or mixed cationic and nonionic) diblock emulsifier of the foregoing LQ or mixed LQ and LX types is dispersed in water. A water-soluble free-radical initiator is then added and optionally a water-soluble chain transfer agent is also added to control the molecular weight of the latex particles formed during emulsion polymerization. A polymerizable component containing elastomer monomer, plus any comonomer, is added and the mixture is then heated to a temperature suitable for emulsion polymerization.

During emulsion polymerization, the diblock emulsifier stabilizes the monomer droplets of the polymerizable component dispersed in the aqueous phase and forms micelles which become swollen with monomer(s) from the dispersed droplets. While not intending to be limited by theory, it seems that the free-radical initiator diffuses into the monomer-swollen micelles and initiates polymerization of the monomer(s) to form the latex particles. The diblock emulsifier on the surface of the micelles solvates additional monomer and stabilizes the forming latex particles. Eventually, the diblock emulsifier becomes grafted or embedded onto the elastomeric core of the particle to form the cationic, or mixed cationic/nonionic hydrophilic shell.

A variety of elastomer monomers can comprise the polymerizable component. The only requirements are that the monomer be water-insoluble and have at least one double bond. Examples of suitable elastomer monomers include butadiene, isoprene and mixtures thereof. The polymerizable component can also include other comonomers or mixtures of comonomers which impart stiffness and strength, cross-linking capability to control flowability at elevated temperatures or other desirable properties to the latex particles. Examples of such comonomers include styrene, alphamethyl styrene, vinyl toluenes, divinyl benzene, vinyl acetate, acrylic acid, methacrylic acid, acrylonitrile, methacrylonitrile, acrylamide, methacrylamide, methyl acrylate, ethyl acrylate and like acrylates, methyl methacrylate, ethyl methacrylate and like methacrylates, maleic anhydride, fumaric acid, itaconic acid, crotonic acid, ethylene, propylene, and mixtures thereof.

Usually, the polymerizable component comprises from about 5 to about 50% by weight of the aqueous phase. Preferably, the polymerizable component comprises from about 10 to about 25% by weight of the aqueous phase. The elastomer monomer(s) usually comprises from about 40 to 80% by weight of the polymerizable component, while the comonomer(s) comprises from 0 to about 60% by weight of the component. Preferably, the elastomer monomer(s) comprises from about 60 to about 100% by weight of the component, while the comonomer(s) comprise from about 0 to about 40% by weight of the component. Particularly preferred polymerizable components comprise from about 50 to about 75% by weight butadiene (or isoprene) and from about 25 to about 50% by weight styrene or a mixture of styrene with up to 2% by weight divinylbenzene. Such butadiene-styrene or isoprene-styrene mixtures can optionally comprise up to about 10% by weight acrylic acid or methacrylic acid.

A particularly important component in this emulsion polymerization process of the present invention is the cationic (or mixed cationic and nonionic) diblock emulsifier. The diblock emulsifier is used in an effective amount in the emulsion polymerization process. What is "an effective amount" depends upon the particular emulsifier being used, the type of cationic latex composition desired, and like factors. Usually, the diblock emulsifier comprises from about 2 to about 20% by weight of the polymerizable component. Preferably, the diblock comprises from about 4 to about 10% by weight of the polymerizable component.

A particularly important factor in determining what diblock emulsifier to use is the ability of the emulsifier to become grafted to the core of the formed latex particles. As long as this key factor is satisfied, the selection of the diblock emulsifier is essentially a matter of what properties are desired in the cationic latex composition. This diblock emulsifier can consist entirely of the cationic diblock, or is typically a mixture of cationic diblock and nonionic diblock. Usually, the weight ratio of cationic diblock to nonionic diblock in the mixture ranges from about 1:5 to about 5:1; preferably 1:1 to 1:5, most preferably this weight ratio is from about 1:2 to about 1:3.

D. Preparation of Cationic End-capped Diblock

The general reaction sequence for the synthesis of cationic diblock materials LQ used herein involves preparing the tosylate derivative (2) of the LX ethoxylate (1), followed by amination to form amine (3) and reaction with an alkyl halide to form the quaternized end-capping group (4), according to the following reaction sequence:

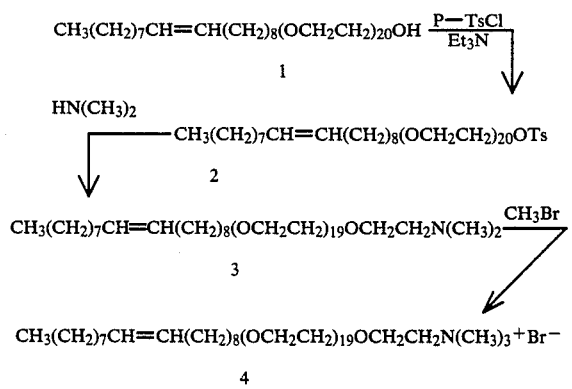

A typical synthesis is as follows:

Preparation of Oleyl($EO_{19}$)$OCH_2CH_2N(CH_3)_3{}^+Br^-$
A recrystallized sample of p-toluenesulfonyl chloride (550 g; 2.9 moles) was added in two batches (20 min apart) to a solution of 3.0 kg (2.6 mole) of oleyl ethoxylate ($EO_{20}$) and 871 g (8.61 mole) of triethylamine in 10 L of acetonitrile under an argon atmosphere at room temperature (25–30° C.). The mixture was stirred for three days at room temperature and then was filtered and concentrated. Three liters of water were added and the mixture was extracted three times with methylene chloride. The organic layers were combined, dried, filtered and concentrated yielding 3336 g of a viscous oil, oleyl ($EO_{19}$)$CH_2CH_2OTs$: 1H NMR 7.8 (d, Ar), 7.4 (d, Ar), 5.3 (t, =CH), 3.4–3.9 (m, $OCH_2$), 2.4 (s, $ArCH_3$), 2.0 (m, =$CCH_2$), 0.9–1.6 (m, $CH_3CH_2$). The oil was taken up in 1 gal of acetonitrile and 1654 mL of condensed dimethylamine was added. The mixture was stirred overnight at room temperature and then the excess amine and acetonitrile were removed under a vacuum. While the mixture was heated with a hot water bath, 3 L of 5% sodium hydroxide were added and the mixture was extracted with methylene chloride. The organic layers were combined, dried, filtered and evaporated yielding 2305 g of oleyl ($EO_{19}$)$CH_2CH_2N(CH_3)_2$: 1H NMR 5.3 (t, =CH), 3.4–3.9 (m,$OCH_2$, 2.5 (t, $NCH_2$), 2.3 (s, $NCH_3$, 2.0 (m, =CCH), 0.9–1.6 (m, $CH_3CH_2$). The oleyl ($EO_{19}$)$OCH_2CH_2N(CH_3)_2$ was dissolved in 1 gal of acetonitrile and then methyl bromide was bubbled into the solution which was initially at room temperature. The temperature rose to 48° C. The addition was continued for 2.5 h until the excess methyl bromide began refluxing. The mixture was stirred for 3 h at room temperature and then concentrated. A $^{13}C$ NMR analysis indicated that up to 5% of the amine remained unreacted. The crude product was redissolved in 4 L of acetonitrile and methyl bromide was bubbled into the solution for 45 min. 50 mL of 10% sodium carbonate was added and the mixture was stirred at 40° C. overnight. The mixture was then filtered and concentrated yielding 2439 g of oleyl ($EO_{19}$)$OCH_2CH_2N(CH_3)_3{}^+Br^-$: 1H NMR 5.3 (t, =CH), 3.4–3.0 (m, $OCH_2$ 3.45 (s, $N^{+1}CH_3$), 2.0 (=$CCH_2$). 0.9–1.6 (m, $CH_3CH_2$). By negative cationic titration, Total Cationic=87.5% [$N^+(CH_3)_3$ plus $N^+H(CH_3)_2$] and Quaternary=82.2% [$N^+(CH_3)_3$ only].

E. Optional Nonionic Diblock

It will be appreciated that the nonionic materials (LX) which may be used as the optional, but preferable nonionic diblocks herein, and which are used in the synthesis of the cationic end-capped diblock materials comprise typical ethoxylated alcohol derivatives of alkenyl and/or polyunsaturated hydrocarbyl groups, generally in the chain length range of from about 10 to about 22 carbon atoms and include, for example, hydrocarbyl groups derivable from such materials as oleic acid, linoleic acid, linolenic acid, eleostearic acid, parinaric acid, and the like. Other unsaturated groups include oligomeric and polymeric materials having residual double bonds, including polybutadiene mixtures, polyisoprene mixtures, and the like. The oleyl group is a preferred unsaturated hydrocarbyl group in the nonionic di-block materials herein.

The polyoxyalkylene substituents on LX are of the formula ($OCH_2CH_2$)$_n$—OH, where n is an interger from 5 to about 50, preferably from about 10 to about 20. It will be readily appreciated by those skilled in the emulsifier arts that these nonionic materials fall within the class of well-known ethoxylated alcohol nonionic surfactants, with the proviso that the hydrocarbyl substituent have one or more points of unsaturation which allow the material to become involved in the polymerization process, thereby chemically bonding the material to the latex particles. A commercially available material of this type is available under the trade name "VOLPO-20", which comprises an oleyl group and an average of 20 ethoxylate units.

The following examples illustrate the practice of this invention in more detail, using the above-disclosed quaternary and nonionic diblocks.

EXAMPLE I

A wet-end-depositable cationic latex based on styrene-butadiene rubber was prepared in the following manner. A mixture of a surfactant solution prepared by dissolving 6.44 g of oleyl ethoxylate having approximately 20 ethoxylate units in 500 mL of distilled water, another surfactant solution prepared by dissolving 2.15 g of derivatized oleyl ethoxylate having approximately 20 ethoxylate units with a quaternary ammonium functional group attached to the terminal end of the ethoxylate chain in 150 mL of distilled water, an initiator solution prepared by dissolving 0.72 g of 2,2'-azobis(2-amidinopropane) dihydrochloride in 50 mL of distilled water, and additional 301 mL of distilled water was placed in a 2 L stainless steel high-pressure reactor equipped with a mechanical stirrer. The distilled water used in this reaction was purged with argon before being used, and the reactor was flushed with nitrogen gas before the solution mixture was placed inside. The reactor containing the solution mixture was further purged with argon gas for one hour, then 0.72 g of divinylbenzene and 57.2 g of styrene were injected into the reactor. The transfer of 85.8 g of 1,3-butadiene into the reactor was carried out by condensing it in a 100 mL graduated cylinder first and then injecting the condensate. The reactor was sealed and the reaction mixture was heated to 60° C. and maintained at the constant temperature throughout the reaction with slow agitation with the mechanical stirrer for 18 hours to complete the emulsion polymerization.

A solid content of the latex product was estimated by the following method. Approximately 2 mL of the latex was dried in an oven at 110° C. for at least one hour. From the weight of this sample before and after drying, the solid content of the latex was calculated to be 13.1%. The particle size (diameter) of the latex measured by quasi-elastic light scattering was $0.154 \pm 0.036$ $\mu$. The surface hydrophilicity of the solid product made from the latex was also measured. A solid film sample of the latex was obtained by placing 1.0 mL of the reaction product onto a 2.5 cm $\times$ 7.5 cm glass plate and allowing to dry at room temperature for several days. The surface hydrophilicity of the film was determined by placing 4 $\mu$L of distilled water over the film which was kept horizontal and observing the contact angle between the film surface and water sessile drop using a horizontal microscope equipped with a goniometer. The contact angle of water averaged over six measurements was $8.2° \pm 1.0°$.

The wet-end depositability of the cationic latex onto the surface of wood pulp was verified in the following manner. A mixture of the cationic latex and a refined Krafft pulp suspension in water with 0.1% consistency by weight was prepared such that the dry-weight ratio between the pulp and latex became about 5:1. Using sulfuric acid, the pH of the mixture was adjusted to 4.5. The turbidity of the mixture decreased quickly and became clear within 30 minutes under gentle agitation at room temperature. Observation of pulp under a microscope confirmed that latex particles were deposited onto the surface of pulp fibers.

The efficacy of the latex as a wet-strength improving additive for paper and cellulosic nonwoven products was tested by forming a handsheet. A 12 in $\times$ 12 in handsheet weighing 2.5 g was prepared from a mixture of untreated refined Krafft pulp and similar Krafft pulp treated with the cationic latex. The weight ratio between the untreated pulp and pulp treated with the latex was 4:1, and total add-on level of the latex in the handsheet was 4%. The handsheet was drum dried first and then pressed at 50 psi for a minute at 110° C. The wet-strength of the handsheet was determined by measuring the tensile strength required to tear a one-inch-wide strip of the handsheet after the sample was soaked with water. The wet-strength measured for the latex containing handsheet was $199 \pm 22$ g/in.

EXAMPLE II

A wet-end-depositable cationic latex based on styrene-butadiene rubber was prepared in the manner similar to Example I. A reaction mixture having identical compositions described in Example I except without the addition of divinylbenzene was placed in a sealed 2 L stainless steel high-pressure reactor equipped with a mechanical stirrer. The mixture was then heated to 60° C. and maintained at the temperature 47 hours with slow agitation to complete the emulsion polymerization. A latex containing 12.3% solids by weight, determined by the method described in Example I, was obtained.

The surface-hydrophilicity of the solid product made from the latex was measured by the method described in Example I. The average contact angle of a sessile water drop placed on the surface of a film prepared from the latex was $7.2° \pm 1.0°$. The wet-end depositability of the latex onto the surface of wood pulp was verified, and the wet tensile strength of a handsheet containing 4% latex was measured by the methods described in Example I. The average wet strength was $341° \pm 14$ g/in.

EXAMPLE III

A wet-end-depositable cationic latex based on styrene-butadiene-acrylic acid copolymer rubber was prepared in the following manner. A mixture of a surfactant solution prepared by dissolving 0.32 g of oleyl ethoxylate having approximately 20 ethoxylate units in 15 mL of distilled water, another surfactant solution prepared by dissolving 0.105 g of derivatized oleyl ethoxylate having approximately 20 ethoxylate units with a quaternary (trimethyl) ammonium functional group attached to the terminal end of ethoxylate chain in 15 mL of distilled water, an initiator solution prepared by dissolving 0.142 g of 2,2'-azobis(2-amidinopropane) dihydrochloride in 15 mL of distilled water, and additional 11.4 mL of distilled water was placed in a 250 mL thick-walled glass reaction bottle with a magnetic stirring rod. The distilled water used in this reaction was purged with argon for 15 minutes before being used. The reaction bottle containing the solution mixture of surfactants and initiator was flushed with nitrogen and sealed with a rubber gasket which was covered with a metal bottle cap with two holes. The transfer of 0.53 g of acrylic acid, 0.073 g of divinylbenzene, and 1.75 g of styrene into the reaction bottle was made by injecting the monomers through the rubber gasket with a syringe. The transfer of 5.25 g of 1,3-butadiene was made by condensing it first in a 15 mL graduated cylinder submerged in dry ice and injecting the condensate into the reaction bottle with a syringe. The reaction bottle was then placed in an oil bath set at 60° C. throughout the reaction period with slow agitation of the reaction mixture with a magnetic stirrer for 16 hours to complete the emulsion polymerization. A latex having a solid content of 10.4% was obtained. The wet-end depositability of the latex was verified by the method described in Example I.

EXAMPLE IV

A wet-end-depositable cationic latex based on styrene-butadiene rubber synthesized with anionic free radical initiator was prepared in the manner similar to Example III. A solution mixture prepared by dissolving 0.28 g of oleyl ethoxylate surfactant having approximately 20 ethoxylate units, 0.07 g of derivatized oleyl ethoxylate surfactant having approximately 20 ethoxylate units with a quaternary ammonium functional group attached to the terminal end of ethoxylate chain, and 0.035 g of potassium persulfate free-radical initiator in 56.4 mL of distilled water was placed in a 250 mL thick-walled glass reaction bottle with a magnetic stirring rod. The distilled water was purged with argon for 15 minutes before being used. The reaction bottle containing the solution mixture of surfactants and initiator was flushed with nitrogen and sealed with a rubber gasket covered with a metal cap and two holes. The transfer of 1.75 g of styrene and 5.25 g of 1,3-butadiene into the reaction bottle was carried out with a syringe as described in Example III. The reaction bottle was placed in an oil bath set at 60° C. throughout the reaction period with slow agitation of the reaction mixture with a magnetic stirrer for 16 hours to complete the emulsion polymerization.

The solid content of the latex determined by the method described in Example I was 7.6%. The surface hydrophilicity of the solid product made from the latex was measured by the method described in Example I. The average contact angle of a sessile water drop placed on the surface of a film prepared from the latex was 5.8°±0.8°.

EXAMPLE V

A wet-end-depositable cationic latex based on styrene-butadiene rubber synthesized in the presence of cationic surfactant was prepared in the manner similar to Example III. A solution mixture prepared by dissolving 0.105 g of derivatized oleyl ethoxylate surfactant having approximately 20 ethoxylate units with a quaternary ammonium functional group attached to the terminal end of ethoxylate chain and 0.035 g of 2,2'-azobis-(2-amidinopropane) dihydrochloride free-radical initiator in 49 mL of distilled water was placed in a 250 mL thick-walled glass reaction bottle with a magnetic stirring rod. The distilled water was purged with argon before being used. The reaction bottle containing the solution mixture of surfactant and initiator was sealed with a rubber gasket covered with a metal cap with two holes. The transfer of 2.8 g of styrene, 4.2 g of 1,3-butadiene, and 0.035 g of divinylbenzene was carried out with a syringe as described in Example III. The reaction bottle was placed in an oil bath set at 60° C. throughout the reaction period with slow agitation of the reaction mixture with a magnetic stirrer for 17 hours to complete the emulsion polymerization.

The solid content of the latex determined by the method described in Example I was 12.5%. The wet-end depositability of the latex onto the surface of wood pulp was verified, and the wet tensile strength of a handsheet containing 4% latex was measured by the methods described in Example I. The average wet strength was 61°±2 g/in.

EXAMPLE VI

The applicability of a cationic latex as a wet-end additive for a continuous papermaking process was demonstrated in the following manner. Approximately 500 dry pounds of refined northern softwood Kraft pulp was dispersed in water at the consistency of about 2.5% and kept in a stirred holding tank. The pH of pulp mixture was adjusted to 4.5 with sulfuric acid. About 100 gal. of cationic latex prepared according to a recipe similar to that described in Example I was added to the pulp to achieve the wet-end deposition of the binder. The extent of the deposition process was determined by centrifuging samples obtained from the pulp mixture and checking the turbidity of the supernatant. The turbidity due to the undeposited latex particles disappeared within 30 minutes.

The latex-treated pulp was then fed to a pilot scale paper machine (equipped with normal papermaking process components, such as headbox, forming wire, and continuous dryer) at a rate of about 20 gal/min. The paper machine was operated at the production speed of 800 ft/min, producing paper products having a basis weight around 15 lb/3000 ft$^2$. Samples of paper products were collected after the paper machine operation approached sufficiently close to the steady state.

The latex content of the final paper products was measured by x-ray fluorescence analysis. The analysis was done by brominating the unsaturated double bonds of a styrene-butadiene rubber component of the latex and then measuring the x-ray fluorescence intensity. The estimated latex add-on level for the sample measured by this method was 11.6°±1.2%. The wet strength of the latex-containing paper product produced by a continuous pilot paper machine was determined by measuring the tensile strength required to tear a one-inch-wide strip of paper product after the sample was soaked in water. The wet strength measured for the latex-containing paper was 153 g/in. In comparison, the wet strength of a paper product, produced by a similar process using the same pilot paper machine but without the addition of latex binder, did not exceed 25 g/in.

What is claimed is:

1. A process for preparing a latex composition which comprises the steps of:
   (A) providing a mixture containing
      (a) water;
      (b) a dispersion of from about 5 to about 50% of a substantially water-insoluble polymerizable component which comprises a monomer selected from the group consisting of butadiene, isoprene, styrene, and mixtures thereof;
      (c) an effective amount of water-soluble free-radical polymerization initiator;
      (d) an effective amount of a water-soluble chain transfer agent; and
      (e) an effective amount of an amphiphilic diblock emulsifier which comprises a quaternary ammonium capped polyethyleneoxide derivative of a $C_{10}$-$C_{20}$ unsaturated hydrocarbyl moiety; and
   (B) heating the mixture to a temperature sufficient to cause emulsion polymerization of the polymerizable component, so as to provide a latex composition comprising latex particles capable of forming a film having a substantially permanent hydrophilic surface when the water is removed.

* * * * *